UNITED STATES PATENT OFFICE.

JOHN JAMES HOOD AND ALFRED GORDON SALAMON, OF LONDON, ENGLAND, ASSIGNORS TO THE OIL REFINING IMPROVEMENTS COMPANY, LIMITED, OF GLASGOW, SCOTLAND.

TREATMENT OF MINERAL AND VEGETABLE OILS.

962,840.

Specification of Letters Patent. Patented June 28, 1910.

No Drawing. Application filed July 26, 1909. Serial No. 509,591.

*To all whom it may concern:*

Be it known that we, JOHN JAMES HOOD and ALFRED GORDON SALAMON, subjects of the King of Great Britain, both residing at 1 Fenchurch avenue, London, England, have invented new and useful Improvements in the Treatment of Mineral and Vegetable Oils, of which the following is a specification.

The object of the invention is to efficiently decolorize, and in some instances deodorize, for commercial purposes, crude oil whether mineral oil or vegetable oil, such for instance as cotton seed oil and wood oil, or the fractionated products thereof. This is effected by using as a filtering material for the crude or fractionated oil chemically precipitated magnesia which has been very thoroughly washed dried and ignited below bright redness, *i. e.* to a dull red heat for a sufficient time to render it practically anhydrous. When magnesia is precipitated it appears in the hydrated form $MgO.H_2O$ and this molecule of water is removed by the heating. Moreover in order to obtain the maximum of efficiency of the filtering material it is desirable to protect it as far as possible from atmospheric influence after heating until such time as it is brought into contact with the oil.

The amount of oil that can be passed through a given weight and volume of the filtering material will vary with the commercial requirements in respect of the color of the oil, but it is found that satisfactory results can be obtained by using a series of two or more filtering vessels, and ultimately using the last or catch vessel as the first vessel of the series, but we do not restrict ourselves to this method of employing the material. When the material is no longer satisfactory it can generally be again fitted for use by distilling off the absorbed oil, driving it out with steam or washing it out with light petroleum ether according to circumstances and then igniting for a suitable time at a dull red heat.

In treating thick dark viscid oils, such as the fractions intended for lubricating purposes or crude cotton seed oil, we proceed as follows:—The viscid oil is dissolved in a suitable volume of light petroleum spirit, such volume being determined for each particular dark oil experimentally, and the solution is passed through the filtering medium. The latter is then washed with such spirit, and the resulting filtrate and washings distilled; such distillation may be carried on continuously, the filtrate being run in a continuous stream from the filters to the still. The light spirit so used is collected and may be used again for similar purposes.

It is found that generally the lower the boiling point of the spirit the greater its efficiency, and also that generally a light spirit which reacts to any marked extent when treated with bromin is not so efficient as one that will not readily react with bromin. Without attempting to describe the theory underlying these observations we desire to point out that as the result of experiments a considerable variation is found in the efficiency of available light spirits and therefore it is necessary to make a preliminary test of the light spirit by mixing it with the oil to be treated and passing the mixture through the filtering material. The selection of the light spirit for efficient use, should depend upon the results thus obtained.

In our application for patent No. 560,916, filed May 12, 1910, we have claimed a process of decolorizing oil, consisting in filtering oil through material prepared by igniting magnesite to a dull red heat.

What we claim is:—

1. The process hereindescribed of decolorizing oil which consists in filtering it through magnesia prepared by first precipitating magnesium hydrate and then rendering the magnesia anhydrous by ignition.

2. The process hereindescribed of decolorizing oil which consists in dissolving it in light petroleum spirit, filtering the solution through magnesia prepared by first precipitating magnesium hydrate and then rendering the magnesia anhydrous by ignition and finally distilling the filtrate.

JOHN JAMES HOOD.
ALFRED GORDON SALAMON.

Witnesses:
R. B. RANSFORD,
H. J. LEWIS.